United States Patent
Tsuge et al.

(10) Patent No.: US 10,840,525 B2
(45) Date of Patent: Nov. 17, 2020

(54) METHOD OF AND APPARATUS FOR ACTIVATING FUEL CELL

(71) Applicant: HONDA MOTOR CO., LTD., Tokyo (JP)

(72) Inventors: Hodaka Tsuge, Tochigi-ken (JP); Takashi Kato, Tochigi-ken (JP); Tadaaki Yamada, Tochigi-ken (JP); Koichiro Sato, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 16/012,890

(22) Filed: Jun. 20, 2018

(65) Prior Publication Data

US 2018/0375125 A1 Dec. 27, 2018

(30) Foreign Application Priority Data

Jun. 26, 2017 (JP) .................. 2017-124220

(51) Int. Cl.
| | |
|---|---|
| *H01M 8/04* | (2016.01) |
| *H01M 8/04225* | (2016.01) |
| *H01M 8/1007* | (2016.01) |
| *H01M 8/04701* | (2016.01) |
| *H01M 8/04029* | (2016.01) |
| *H01M 8/04223* | (2016.01) |
| *H01M 8/1018* | (2016.01) |

(52) U.S. Cl.
CPC ... *H01M 8/04225* (2016.02); *H01M 8/04029* (2013.01); *H01M 8/04268* (2013.01); *H01M 8/04701* (2013.01); *H01M 8/1007* (2016.02); *H01M 2008/1095* (2013.01)

(58) Field of Classification Search
CPC ..................................... H01M 8/04
See application file for complete search history.

(56) References Cited

U.S. PATENT DOCUMENTS

2005/0282049 A1 12/2005 Sasaoka et al.
2013/0022883 A1 1/2013 Lee et al.

FOREIGN PATENT DOCUMENTS

| JP | 2006-40869 | 2/2006 |
|---|---|---|
| JP | 2013-026209 | 2/2013 |
| JP | 2013-038032 | * 2/2013 |
| WO | 2011/125840 | 10/2011 |

OTHER PUBLICATIONS

Japanese Office Action for Japanese Patent Application No. 2017-124220 dated Nov. 6, 2018.

* cited by examiner

*Primary Examiner* — Jacob B Marks
(74) *Attorney, Agent, or Firm* — Amin, Turocy & Watson, LLP

(57) ABSTRACT

A method of activating a fuel cell includes an energizing step. In the energizing step, a hydrogen gas as an anode gas is supplied to an anode, and an inert gas as a cathode gas is supplied to a cathode to produce a potential difference between the anode and the cathode. In this state, current is applied between the anode and the cathode.

6 Claims, 13 Drawing Sheets

FIG. 2

| EMBODIMENT EXAMPLE | ENERGIZING STEP (CYCLIC CURRENT) ENERGIZING PERIOD [HOUR] | VOLTAGE RATIO |
|---|---|---|
| 1-1 | 0.5 | 1.033 |
| 1-2 | 1.0 | 1.064 |
| 1-3 | 3.0 | 1.125 |
| 1-4 | 5.0 | 1.143 |
| COMPARATIVE EXAMPLE 1 | 0.0 | 1.000 |

FIG. 3

| EMBODIMENT EXAMPLE | ENERGIZING STEP (FIXED CURRENT) ENERGIZING PERIOD [HOUR] | VOLTAGE RATIO |
|---|---|---|
| 2-1 | 0.5 | 1.035 |
| 2-2 | 1.0 | 1.056 |
| 2-3 | 3.0 | 1.125 |
| 2-4 | 5.0 | 1.145 |
| COMPARATIVE EXAMPLE 1 | 0.0 | 1.000 |

FIG. 4

| EMBODIMENT EXAMPLE | ENERGIZING STEP (FIXED CURRENT) | | VOLTAGE RATIO |
|---|---|---|---|
| | ENERGIZING CURRENT VALUE [A] | VOLTAGE [V] AT THE TIME OF ENERGIZATION | |
| 3-1 | 0.5 | 0.548 | 1.005 |
| 3-2 | 1.0 | 0.494 | 1.011 |
| 3-3 | 1.5 | 0.438 | 1.016 |
| 3-4 | 2.0 | 0.378 | 1.022 |
| 3-5 | 2.5 | 0.316 | 1.028 |
| 3-6 (2-1) | 3.0 | 0.250 | 1.035 |
| 3-7 | 3.5 | 0.180 | 1.042 |
| 3-8 | 4.0 | 0.107 | 1.045 |
| 3-9 | 4.5 | 0.028 | 1.048 |
| 3-10 | 5.0 | 0.000 | 1.050 |
| COMPARATIVE EXAMPLE 2 | 0.0 | 0.600 | 1.001 |

FIG. 5

| EMBODIMENT EXAMPLE | ENERGIZING STEP (FIXED CURRENT) | | | | VOLTAGE RATIO |
|---|---|---|---|---|---|
| | STACK TEMPERATURE [°C] | DEW POINT OF ANODE GAS [°C] | DEW POINT OF CATHODE GAS [°C] | INTRA-STACK RELATIVE HUMIDITY [%] | |
| 4-1 | 70 | 80 | 80 | 152 | 1.031 |
| 4-2 | 80 | 75 | 80 | 100 | 1.025 |
| 4-3 | 80 | 85 | 85 | 122 | 1.033 |
| 4-4 (2-1) | 40 | 75 | 80 | 644 | 1.035 |
| 4-5 | 40 | 23 | 80 | 644 | 1.031 |
| 4-6 | 40 | 80 | 75 | 644 | 1.035 |
| 4-7 | 80 | 75 | 75 | 81 | 1.014 |

FIG. 6

| EMBODIMENT EXAMPLE | ENERGIZING STEP (FIXED CURRENT) | | VOLTAGE RATIO |
|---|---|---|---|
| | FLOW RATE OF ANODE GAS [NL/MIN] | FLOW RATE OF CATHODE GAS [NL/MIN] | |
| 5-1 (2-1) | 5 | 20 | 1.035 |
| 5-2 | 10 | 20 | 1.034 |
| 5-3 | 5 | 40 | 1.035 |

FIG. 7

| EMBODIMENT EXAMPLE | ENERGIZING STEP AFTER VOLTAGE APPLICATION STEP (CYCLIC CURRENT) ENERGIZING PERIOD [HOUR] | VOLTAGE RATIO |
|---|---|---|
| 6-1 | 0.25 | 1.298 |
| 6-2 | 0.50 | 1.303 |
| 6-3 | 0.75 | 1.308 |
| 6-4 | 1.00 | 1.313 |
| 6-5 | 1.50 | 1.317 |
| 6-6 | 2.40 | 1.328 |
| 6-7 | 3.50 | 1.332 |
| 6-8 | 4.50 | 1.334 |

FIG. 8

| EMBODIMENT EXAMPLE | ENERGIZING STEP AFTER VOLTAGE APPLICATION STEP (CYCLIC CURRENT) | | VOLTAGE RATIO |
|---|---|---|---|
| | VOLTAGE APPLICATION PERIOD [HOUR] (NUMBER OF CYCLES) | ENERGIZING PERIOD [HOUR] | |
| 7-1 | 0.25 (10) | 0.75 | 1.275 |
| 7-2 (6-2) | 0.50 (20) | 0.50 | 1.303 |
| 7-3 | 0.75 (30) | 0.25 | 1.293 |

FIG. 9

| EMBODIMENT EXAMPLE | ENERGIZING STEP AFTER VOLTAGE APPLICATION STEP (FIXED CURRENT) | VOLTAGE RATIO |
|---|---|---|
| | ENERGIZING PERIOD [HOUR] | |
| 8-1 | 0.25 | 1.299 |
| 8-2 | 0.50 | 1.309 |
| 8-3 | 0.75 | 1.312 |
| 8-4 | 1.00 | 1.315 |
| 8-5 | 1.50 | 1.320 |
| 8-6 | 2.40 | 1.327 |
| 8-7 | 3.50 | 1.335 |
| 8-8 | 4.50 | 1.336 |

FIG. 10

| EMBODIMENT EXAMPLE | ENERGIZING STEP AFTER VOLTAGE APPLICATION STEP (FIXED CURRENT) | | VOLTAGE RATIO |
| --- | --- | --- | --- |
| | VOLTAGE APPLICATION PERIOD [HOUR] (NUMBER OF CYCLES) | ENERGIZING PERIOD [HOUR] | |
| 9-1 | 0.25 (10) | 0.75 | 1.276 |
| 9-2 (8-2) | 0.50 (20) | 0.50 | 1.309 |
| 9-3 | 0.75 (30) | 0.25 | 1.292 |

FIG. 11

| EMBODIMENT EXAMPLE | ENERGIZING STEP AFTER VOLTAGE APPLICATION STEP (FIXED CURRENT) | | VOLTAGE RATIO |
| --- | --- | --- | --- |
| | ENERGIZING CURRENT VALUE [A] | VOLTAGE DURING ENERGIZATION [V] | |
| 10-1 | 0.5 | 0.548 | 1.274 |
| 10-2 | 1.0 | 0.494 | 1.285 |
| 10-3 | 1.5 | 0.438 | 1.283 |
| 10-4 | 2.0 | 0.378 | 1.292 |
| 10-5 | 2.5 | 0.316 | 1.297 |
| 10-6 (8-2) | 3.0 | 0.250 | 1.309 |
| 10-7 | 3.5 | 0.180 | 1.314 |
| 10-8 | 4.0 | 0.107 | 1.315 |
| 10-9 | 4.5 | 0.028 | 1.324 |
| 10-10 | 5.0 | 0.000 | 1.321 |

FIG. 12

| EMBODIMENT EXAMPLE | VOLTAGE APPLICATION STEP | | | | ENERGIZING STEP (FIXED CURRENT) | | | | VOLTAGE RATIO |
|---|---|---|---|---|---|---|---|---|---|
| | STACK TEMPERATURE [°C] | DEW POINT OF ANODE GAS [°C] | DEW POINT OF CATHODE GAS [°C] | INTRA-STACK RELATIVE HUMIDITY [%] | STACK TEMPERATURE [°C] | DEW POINT OF ANODE GAS [°C] | DEW POINT OF CATHODE GAS [°C] | INTRA-STACK RELATIVE HUMIDITY [%] | |
| 11-1 | 80 | 80 | 80 | 100 | 70 | 80 | 80 | 152 | 1.295 |
| 11-2 | 80 | 75 | 80 | 100 | 70 | 75 | 80 | 152 | 1.283 |
| 11-3 | 80 | 75 | 80 | 100 | 80 | 85 | 85 | 122 | 1.287 |
| 11-4 | 70 | 80 | 80 | 152 | 70 | 80 | 80 | 152 | 1.308 |
| 11-5 | 70 | 75 | 80 | 152 | 70 | 75 | 80 | 152 | 1.301 |
| 11-6 (8-2) | 80 | 75 | 80 | 100 | 40 | 75 | 80 | 644 | 1.309 |
| 11-7 | 80 | 23 | 80 | 100 | 40 | 23 | 80 | 644 | 1.309 |
| 11-8 | 80 | 75 | 80 | 100 | 40 | 80 | 75 | 644 | 1.309 |
| 11-9 | 80 | 75 | 80 | 100 | 80 | 75 | 75 | 81 | 1.278 |

FIG. 13

| EMBODIMENT EXAMPLE | ENERGIZING STEP AFTER VOLTAGE APPLICATION STEP (FIXED CURRENT) | | VOLTAGE RATIO |
|---|---|---|---|
| | FLOW RATE OF ANODE GAS [NL/MIN] | FLOW RATE OF CATHODE GAS [NL/MIN] | |
| 12-1 (8-2) | 5 | 20 | 1.309 |
| 12-2 | 10 | 20 | 1.310 |
| 12-3 | 5 | 40 | 1.308 |

METHOD OF AND APPARATUS FOR ACTIVATING FUEL CELL

CROSS-REFERENCE TO RELATED APPLICATION

This application is based upon and claims the benefit of priority from Japanese Patent Application No. 2017-124220 filed on Jun. 26, 2017, the contents of which are incorporated herein by reference.

BACKGROUND OF THE INVENTION

Field of the Invention

The present invention relates to a method of activating a fuel cell including an electrolyte membrane of solid polymer, an anode provided on one surface of the electrolyte membrane, and a cathode provided on the other surface of the electrolyte membrane. Further, the present invention relates to an apparatus for activating the fuel cell.

Description of the Related Art

For example, a method of activating a fuel cell disclosed in Japanese Laid-Open Patent Publication No. 2006-040869 is known. In this activation method, anode medium such as methanol solution is supplied to an anode of the fuel cell, and cathode medium such as air is supplied to a cathode. While such media are supplied, energizing current is forcibly applied between the electrodes (anode and cathode) in the same direction as a direction of the current during power generation.

SUMMARY OF THE INVENTION

In the above activation method, energizing current is applied between both electrodes. The energizing current is large electrical current which is equal to that applied during the actual power generation. To this end, an apparatus in large scale, a large quantity of anode medium, and a large quantity of cathode medium are required. Therefore, high cost is required for activation of the fuel cell.

A main object of the present invention is to provide a method of activating a fuel cell in which it is possible to active the fuel cell with simple structure at low cost.

Another object of the present invention is to provide an apparatus for activating a fuel cell in which it is possible to active the fuel cell with simple structure at low cost.

According to one embodiment of the present invention, a method of activating a fuel cell is provided. The fuel cell includes an electrolyte membrane of solid polymer, an anode provided on one surface of the electrolyte membrane, and a cathode provided on another surface of the electrolyte membrane, and the method includes an energizing step of electrically connecting the anode and the cathode to apply current therebetween in a state where a potential difference is produced between the anode and the cathode, by supplying a hydrogen gas as an anode gas to the anode and supplying an inert gas as a cathode gas to the cathode.

In the method of activating the fuel cell, by utilizing the hydrogen concentration difference between the anode to which the hydrogen gas is supplied and the cathode to which the inert gas is supplied, it is possible to produce a potential difference between the anode and the cathode. In this state, by electrically connecting the anode and the cathode, it becomes possible to energize the electrodes (anode and cathode) with small electrical current and small quantities of supplied anode gas and cathode gas, in comparison with the electrical current and the anode gas and the cathode gas used in actual power generation.

The water produced in the electrode reaction at this time can be supplied to the electrode catalyst contained in the anode and the cathode, and the electrolyte membrane. Accordingly, it is possible to place the electrolyte membrane in a humidified state to realize the desired proton conductivity, and supply water to a three-phase interface of the electrolyte catalyst, the electrolyte membrane, and the fuel gas or the oxygen-containing gas as a reaction site where a reaction occurs during power generation of the fuel cell. As a result, it is possible to effectively activate the fuel cell.

As described above, in the method of activating the fuel cell of the present invention, it is not required to provide an apparatus in large scale or large quantities of anode gas and cathode gas for applying large energizing current to the anode and the cathode. For this reason, with the simple structure, it is possible to activate the fuel cell at low cost.

Preferably, the method of activating the fuel cell may further include, before the energizing step, a voltage application step of applying cyclic voltage which is increased and decreased within a predetermined range, to the fuel cell while supplying the hydrogen gas as the anode gas to the anode and supplying the inert gas as the cathode gas to the cathode. By performing the voltage application step, it is possible to remove the materials adhered to the surface of the electrode catalyst contained in the anode and the cathode. Accordingly, it becomes possible to supply water to the surface of the electrode catalyst without being obstructed by the adhered materials in the subsequent energizing step. As a result, it is possible to effectively activate the fuel cell.

In the method of activating the fuel cell, in the energizing step, magnitude of the current applied from the cathode to the anode may be is increased and decreased repeatedly within a predetermined range or magnitude of current applied from the cathode to the anode may be fixed at a constant level. In either case, it is possible to activate the fuel cell with simple structure at low cost.

In the method of activating the fuel cell, preferably, in the energizing step, a dew point of at least one of the anode gas and the cathode gas may be regulated to become higher than a temperature of the fuel cell. In this case, in the energizing step, since it is possible to condense the water vapor contained in at least one of the anode gas and the cathode gas, inside the fuel cell, it is possible to suitably supply water to the electrolyte catalyst and the electrolyte membrane to a greater extent, and effectively activate the fuel cell.

In the method of activating the fuel cell, preferably, a temperature of the fuel cell in the energizing step may be regulated to be not more than a temperature of the fuel cell in the voltage application step. In this case, without regulating the dew points of the anode gas and the cathode gas highly accurately, in the voltage application step, water condensation does not occur significantly inside the fuel cell, and in the energizing step, water condensation occurs easily inside the fuel cell. Therefore, it is possible to suppress variation of the applied voltage in the entire fuel cell in the voltage application step, and it is possible to suitably supply water to the electrode catalyst and the electrolyte membrane in the energizing step. As a result, it is possible to effectively activate the fuel cell to a greater extent.

In the method of activating the fuel cell, preferably, a heat transmission medium having a regulated temperature may be supplied to a coolant flow field provided for the fuel cell to regulate the temperature of the fuel cell. In this case, using the existing structure of the fuel cell, it is possible to efficiently and easily regulate the temperature of the entire fuel cell.

Further, an apparatus for activating a fuel cell to which the activation method of the above described fuel cell is applied is also included in the present invention. That is, another embodiment of the present invention provides an apparatus for activating a fuel cell, the fuel cell comprising an electrolyte membrane of solid polymer, an anode provided on one surface of the electrolyte membrane, and a cathode provided on another surface of the electrolyte membrane, the apparatus including a gas supply unit configured to supply a hydrogen gas as an anode gas to the anode, and supply an inert gas as a cathode gas to the cathode, and an energizing unit configured to apply current between the anode and the cathode in a state where the anode gas is supplied to the anode and the cathode gas is supplied to the cathode by the gas supply unit.

In the apparatus of activating the fuel cell, as described above, the anode gas and the cathode gas are supplied by the gas supply unit. Therefore, it is possible to produce a potential difference utilizing a hydrogen concentration difference between the anode and the cathode. In this state, by electrically connecting the anode and the cathode by the energizing unit, it becomes possible to apply energize current between the electrodes (anode and cathode) with small electrical current and small quantities of supplied anode gas and cathode gas, in comparison with the electrical current and the anode gas and the cathode gas used in actual power generation. As a result, the apparatus in large scale, and large quantities of the anode gas and the cathode gas for applying large energizing current to the anode and the cathode are not required. With the simple structure, it becomes possible to activate the fuel cell at low cost.

Preferably, the apparatus for activating the fuel cell may further include a voltage application unit configured to apply cyclic voltage which is increased and decreased within a predetermined range, to the fuel cell. In this case, since the voltage application unit applies the voltage as described above to make it possible to remove materials adhered to the surface of the electrode catalyst, it becomes possible to effectively activate the fuel cell to a greater extent.

In the apparatus for activating the fuel cell, the energizing unit may be configured to increase and decrease magnitude of the current flowing from the cathode to the anode within a predetermined range, or maintain the magnitude of the current flowing from the cathode to the anode at a constant level. In either case, with the simple structure, it is possible to effectively activate the fuel cell at low cost.

In the apparatus for activating the fuel cell, preferably, while the energizing unit applies the current from the cathode to the anode, the gas supply unit may be configured to regulate a dew point of at least one of the anode gas and the cathode gas to become higher than a temperature of the fuel cell. In this case, when the energizing unit applies the current between both electrodes, it is possible to easily condense water vapor contained in the anode gas or the cathode gas inside the fuel cell.

Therefore, it is possible to supply the water to the electrolyte catalyst and the electrolyte membrane, and effectively activate the fuel cell.

Preferably, the apparatus for activating the fuel cell may further include a temperature regulating unit configured to regulate a temperature of the fuel cell, and the temperature regulating unit may be configured to regulate the temperature of the fuel cell during application of the current from the cathode to the anode by the energizing unit to become not more than the temperature of the fuel cell during application of the voltage by the voltage application unit.

In this case, since the temperature of the fuel cell is regulated by the temperature regulating unit, water is not condensed significantly during voltage application by the voltage application unit. Thus, it is possible to suppress the voltage from non-uniformly applied in the entire fuel cell. On the other hand, during energization by the energizing unit after voltage application, water is condensed easily, and it is possible to supply the water to the electrode catalyst and the electrolyte membrane. As a result, it is possible to effectively activate the fuel cell to a greater extent without regulating the dew points of the anode gas and the cathode gas by the gas supply unit highly accurately.

In the apparatus for activating the fuel cell, preferably, the temperature regulating unit may be configured to supply a heat transmission medium having a regulated temperature to a coolant flow field provided for the fuel cell to regulate the temperature of the fuel cell. In this case, using the existing structure of the fuel cell, it is possible to effectively and easily regulate the temperature of the entire fuel cell.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a table showing energizing periods (cyclic current) and voltage ratios, for stacks according to embodiment examples 1-1 to 1-4 and a comparative example 1;

FIG. 3 is a table showing energizing periods (fixed current) and voltage ratios, for stacks according to embodiment examples 2-1 to 2-4 and the comparative example 1;

FIG. 4 is a table showing energizing current values, voltages at the time of energization, and voltage ratios, for stacks according to embodiment examples 3-1 to 3-10 and a comparative example 2;

FIG. 5 is a table showing stack temperatures, dew points of an anode gas, dew points of a cathode gas, intra-stack relative humidities, and voltage ratios, for stacks according to embodiment examples 4-1 to 4-7;

FIG. 6 is a table showing flow rates of an anode gas and a cathode gas, and voltage ratios, for stacks according to embodiment examples 5-1 to 5-3

FIG. 7 is a table showing energizing periods and voltage ratios in an energizing step (cyclic current) after a voltage application step, for stacks according to embodiment examples 6-1 to 6-8;

FIG. 8 is a table showing voltage application periods, energization periods (cyclic current), and voltage ratios, for stacks according to embodiment examples 7-1 to 7-3;

FIG. 9 is a table showing energizing periods and voltage ratios in an energizing step (fixed current) after a voltage application step, for stacks according to embodiment examples 8-1 to 8-8;

FIG. 10 is a table showing voltage application periods, energization periods (fixed current), and voltage ratios, for stacks according to embodiment examples 9-1 to 9-3;

FIG. 11 is a table showing energizing current values, voltages at the time of energization, and voltage ratios in an energizing step after a voltage application step, for stacks according to embodiment examples 10-1 to 10-10;

FIG. 12 is a table showing stack temperatures, dew points of an anode gas, dew points of a cathode gas, intra-stack relative humidities, voltage ratios in each of a voltage application step and an energizing step, for stacks according to embodiment examples 11-1 to 11-9; and FIG. 13 is a table showing flow rates of an anode gas and a cathode gas, and voltage ratios in an energizing step after a voltage application step, for stacks according to embodiment examples 12-1 to 12-3.

DESCRIPTION OF THE PREFERRED EMBODIMENTS

Figure 1:
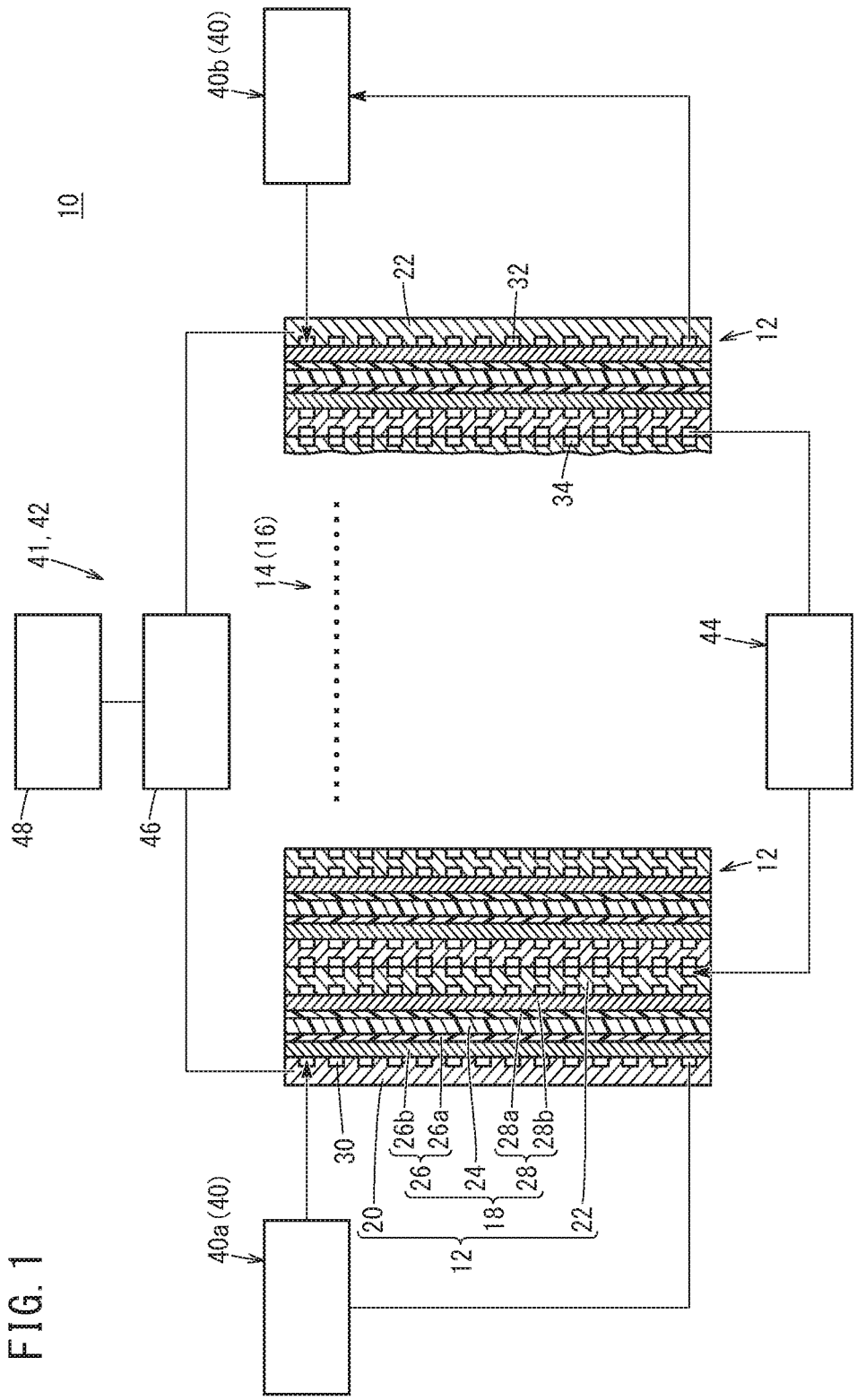
FIG. 1 is a diagram schematically showing structure of an apparatus for activating a fuel cell according to an embodiment of the present invention.

Preferred embodiments of an activation method and an activation apparatus for a fuel cell according to the present invention will be described in detail with reference to the accompanying drawings.

As shown in FIG. 1, an activation apparatus for a fuel cell according to an embodiment of the present invention (hereinafter simply also referred to as the activation apparatus) 10 activates a fuel cell 16 which comprises a stack 14 formed by stacking a plurality of power generation cells 12 (unit fuel cells). It should be noted that the activation apparatus 10 is not limited to the form of the stack 14. A fuel cell (not shown) comprising a single power generation cell 12 can be activated in the same manner.

The power generation cell 12 is formed by sandwiching a membrane electrode assembly (MEA) 18 between a first separator 20 and a second separator 22. For example, the MEA 18 includes an electrolyte membrane 24, an anode 26 provided on one surface of the electrolyte membrane 24, and a cathode 28 provided on another surface of the electrolyte membrane 24. The electrolyte membrane 24 is a thin membrane of solid polymer such as perfluorosulfonic acid.

The anode 26 is made of porous material including a first electrode catalyst layer 26a facing one surface of the electrolyte membrane 24, and a first gas diffusion layer 26b stacked on the first electrode catalyst layer 26a. The cathode 28 is made of porous material including a second electrode catalyst layer 28a facing the other surface of the electrolyte membrane 24, and a second gas diffusion layer 28b stacked on the second electrode catalyst layer 28a. Each of the first electrode catalyst layer 26a and the second electrode catalyst layer 28a includes catalyst particles (electrode catalyst) supporting catalyst metal of platinum, etc. on a catalyst support of carbon such as carbon black, and an ion conductive polymer binder. It should be noted that the electrode catalyst may only comprise catalyst metal such as platinum black, and the electrode catalyst may not include the catalyst support.

In the case where the electrode catalyst comprises platinum, for example, the following electrode reaction occurs on the surface of the electrode catalyst: $2Pt+H_2O+\frac{1}{2}O_2+e^- \rightarrow 2Pt(OH^-)$, $Pt(OH^-)+H_3O^+ \rightarrow Pt+2H_2O$ This electrode reaction is facilitated by supplying water to the surface of the electrode catalyst so that water is present on the three-phase interface surface. The three-phase interface surface is an interface surface among the electrode catalyst, the electrolyte membrane 24, and the fuel gas or the oxygen-containing gas as a reaction site during actual power generation of the stack 14. The expression "during actual power generation of the stack 14" herein refers to, e.g., a period in which a fuel gas such as a hydrogen gas is supplied to the anode 26, and an oxygen-containing gas such as air is supplied to the cathode 28 to actually obtain electrical energy from the stack 14.

For example, each of the first gas diffusion layer 26b and the second gas diffusion layer 28b comprises a carbon paper, carbon cloth, etc. The first gas diffusion layer 26b is placed to face the first separator 20, and the second gas diffusion layer 28b is placed to face the second separator 22. For example, carbon separators are used as the first separator 20 and the second separator 22. Alternatively, metal separators may be used as the first separator 20 and the second separator 22.

The first separator 20 has a fuel gas flow field 30 on its surface facing the first gas diffusion layer 26b. The fuel gas flow field 30 is connected to a fuel gas supply passage (not shown) for supplying a fuel gas such as a hydrogen-containing gas, and a fuel gas discharge passage (not shown) for discharging the fuel gas.

The second separator 22 has an oxygen-containing gas flow field 32 on its surface facing the second gas diffusion layer 28b. The oxygen-containing gas flow field 32 is connected to an oxygen-containing gas supply passage (not shown) for supplying an oxygen-containing gas, and connected to an oxygen-containing gas discharge passage (not shown) for discharging the oxygen-containing gas.

When a plurality of the power generation cells 12 are stacked together, a coolant flow field 34 is formed between a surface of the first separator 20 and a surface of the second separator 22 which face each other. The coolant flow field 34 is connected to a coolant supply passage (not shown) for supplying a coolant and a coolant discharge passage (not shown) for discharging the coolant.

Next, the activation apparatus 10 will be described. The activation apparatus 10 includes a gas supply unit 40, an energizing unit 41, a voltage application unit 42, and a temperature regulating unit 44 as main components. The gas supply unit 40 includes a first supply unit 40a for supplying a hydrogen gas as an anode gas to the anode 26 through the fuel gas flow field 30, and a second supply unit 40b for supplying an inert gas, e.g., nitrogen gas as a cathode gas to the cathode 28 through the oxygen-containing gas flow field 32.

The first supply unit 40a can regulate the flow rate of the anode gas supplied to the anode 26, and mix water vapor with the anode gas to regulate the dew point of the anode gas. Likewise, the second supply unit 40b can adjust the flow rate of the cathode gas supplied to the cathode 28, and mix water vapor with the cathode gas to adjust the dew point of the cathode gas.

The energizing unit 41 electrically connects the anode 26 to which the anode gas has been supplied from the first supply unit 40a and the cathode 28 to which the cathode gas has been supplied from the second supply unit 40b for energization between both electrodes (the anode 26 and the cathode 28). That is, the energizing unit 41 supplies electrical current from the cathode 28 to the anode 26 based on the hydrogen concentration difference between the anode 26 and the cathode 28. In this regard, the energizing unit 41 can increase and decrease the magnitude of the electrical current flowing between the anode 26 and the cathode 28 repeatedly within a predetermined range, or can maintain the magnitude of the electrical current at a constant level.

The voltage application unit 42 applies cyclic voltage which is increased and decreased within a predetermined range, to the stack 14 through the first separator 20 provided at one end of the stack 14 in the stacking direction and the second separator 22 provided at another end of the stack 14 in the stacking direction. That is, the voltage application unit 42 can change the applied voltage over time, and repeat the changes over time, under control which is similar to that of potential sweep in the cyclic voltammetry.

For example, the energizing unit 41 and the voltage application unit 42 can be made up of a potentio/galvanostat (P/G stat) 46 which is capable of implementing current control and potential control between the electrodes, and a sweeper 48, etc. capable of changing the preset current and the preset potential of the P/G stat 46 over time.

The temperature regulating unit 44 supplies heat transmission medium regulated at a predetermined temperature to the coolant flow field 34 to regulate the temperature of the stack 14. By adopting the temperature regulating unit 44 to have the above structure, it is possible to effectively and easily regulate the temperature of the entire stack 14 using the existing structure of the stack 14.

The temperature regulating unit 44 is not limited to the above structure as long as the temperature regulating unit 44 can regulate the temperature of the stack 14. For example, a heater (not shown) capable of heating the stack 14 may be provided.

Further, the gas supply unit 40 and the temperature regulating unit 44 may circulate the anode gas, the cathode gas, and the heat transmission medium to/from the stack 14 or supply the heat transmission medium to flow along the stack 14 internally (hermetically inside the stack 14) or flow through the stack 14 and discharge it without circulation.

The activation apparatus 10 according to the embodiment of the present invention basically has the above structure. Next, a method of activating the fuel cell according to the embodiment of the present invention, using the activation apparatus 10 will be described (hereinafter also simply referred to as the activation method).

In the embodiment of the present invention, the activation process is applied to the stack 14 immediately after assembling the stack 14. For this purpose, firstly, the energizing unit 41 and the voltage application unit 42 (P/G stat 46) are electrically connected to the stack 14. The first supply unit 40a is connected to the fuel gas flow field 30, the second supply unit 40b is connected to the oxygen-containing gas flow field 32, the temperature regulating unit 44 is connected to the coolant flow field 34, and the stack 14 is set to the activation apparatus 10.

Next, a voltage application step is performed. In the voltage application step, the first supply unit 40a supplies a hydrogen gas the anode 26, and the second supply unit 40b supplies an inert gas to the cathode 28. Further, the voltage application unit 42 applies cyclic voltage which is increased and decreased cyclically within the predetermined range to the stack 14. That is, the P/G stat 46 as the voltage application unit 42 implements potential control between the anode 26 and the cathode 28.

In this manner, it is possible to remove adhered materials such as residual solvent (carbon functional group) and oxide films adhered to the surface of the electrode catalyst contained in the cathode 28 and the anode 26, and clean these surfaces. Since this voltage application step can be preformed in the same manner as described in Japanese Laid-Open Patent Publication No. 2013-038032, the detailed description is omitted.

As described above, in the voltage application step of supplying the inert gas to the cathode 28, it is possible to clean the surface of the electrode catalyst without inducing power generation reactions. Therefore, for example, in comparison with the case of activating the stack 14 by supplying the oxygen-containing gas to the cathode 28 to induce power generation reactions, it is possible to reduce the consumed quantity of the gas, and simplify the required equipment.

Further, in the voltage application step, since the above power generation reaction does not occur, the quantity of heat produced in the stack 14 is small. Therefore, the temperature regulating unit 44 may regulate the temperature of the stack 14 up to a temperature where the above cleaning in the voltage application step can be facilitated. Further, since no water is produced during power generation reaction, preferably, in order to avoid the electrolyte membrane 24 from being dried, the gas supply unit 40 should be operated to allow at least one of the anode gas and the cathode gas to contain water vapor.

Further, in this regard, preferably, the temperature of the stack 14 and the dew points of the gases should be regulated in order to achieve the relationship where both of flooding in the stack 14 and drying of the electrolyte membrane 24 are suppressed. Flooding herein means, for example, the presence of excessive water in the liquid state in the stack 14 to a degree where supply of the gases is obstructed by the excessive water.

In this regard, intra-stack relative humidity is defined by an equation (saturated water vapor amount at the dew point of the anode gas or the cathode gas)/(saturated water vapor amount at the temperature of the stack 14)×100=intra-stack relative humidity (%)(equation 1). In this case, for example, by regulating the intra-stack relative humidity to about 100%, it becomes possible to satisfy the above relationship. In this manner, by regulating the temperature of the stack 14 and the dew points of the gases, it becomes possible to prevent the voltage from being applied in the entire stack 14 non-uniformly. Therefore, it becomes possible to suitably clean the electrode catalyst in the entire stack 14. Further, by suppressing drying of the electrolyte membrane 24, it is possible to eliminate the concern of damage, etc. which could occur in the electrolyte membrane 24.

Preferably, the voltage application unit 42 applies the voltage to the stack 14 in a range between 0.08 V and 1.00 V. By adopting the applied voltage of 0.08 V or more, in the voltage application step, it becomes possible to repeatedly induce reactions where hydrogen is adsorbed on, and removed from the electrode catalyst (catalyst metal). In this manner, it becomes possible to effectively clean the surface of the electrode catalyst to a greater extent. Further, by adopting the applied voltage of 1.00 V or less, even in the case where the electrode catalyst includes a carbon catalyst support, it becomes possible to avoid degradation of the catalyst support.

Preferably, the number of cycles the voltage is applied to the stack 14 by the voltage application unit 42 (period of performing the voltage application step) may be determined in consideration of appearance of a peak as a sign indicating that the surface of the electrode catalyst is sufficiently cleaned, in a voltage-current change curve (not shown) obtained by application of the voltage. Examples of such a peak include a reduction peak which appears between 0.8 V and 0.6 V at the time of decreasing the voltage. By stopping application of the voltage by the voltage application unit 42 after appearance of the reduction peak, more preferably, after the elapse of a predetermined period from appearance of the reduction peak, it is possible to perform the voltage application step appropriately without any excess or shortage.

For example, in the voltage application step, the voltage is increased from 0.08 V to 1.00 V for a period of 45 seconds, and thereafter, the voltage is decreased from 1.00 V to 0.08 V for a period of 45 seconds. Assuming that one cycle is made up of these periods, it is preferable to repeat this cycle 20 or more times, i.e., perform the voltage application step for 30 minutes (0.50 hours) or more. In this manner, materials adhered to the surface of the electrode catalyst are removed sufficiently, and it becomes possible to achieve the sufficient magnitude of a Q (coulomb) value as an indicator value indicating the effective area of the electrode catalyst.

After application of the voltage by the voltage application unit 42 is stopped, the gas supply unit 40 continues to supply the gases. As a result, a potential difference is produced due to the hydrogen concentration difference between the anode 26 to which the hydrogen gas is supplied as the anode gas and the cathode 28 to which the inert gas is supplied as the cathode gas. In the state where the potential difference is produced in this manner, the energizing unit 41 electrically connects the anode 26 and the cathode 28 to perform the energizing step for applying the energizing current between the electrodes.

That is, in the energizing step, as the energizing unit 41, the P/G stat 46 implements electrical current control between the anode 26 and the cathode 28. At this time, the energizing unit 41 may increase and decrease the magnitude of the energizing current applied from the cathode 28 to the anode 26 repeatedly within a predetermined range, or may apply the energizing current having the fixed magnitude at a constant level.

By performing the energizing step in this manner, it is possible to apply the energizing current between the electrodes using the smaller electrical current and the smaller supply quantities of the anode gas and the cathode gas than those used at the time of actual power generation. In this case, the anode 26 and the cathode 28 form a hydrogen concentration cell. Therefore, the following electrode reaction occurs at the anode 26.

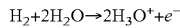
$$H_2 + 2H_2O \rightarrow 2H_3O^+ + e^-$$

In the meanwhile, the following electrode reaction occurs at the cathode 28.

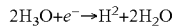
$$2H_3O^+ + e^- \rightarrow H^2 + 2H_2O$$

Therefore, by performing the energizing step, it is possible to supply the water produced in the above reactions to the electrode catalyst and the electrolyte membrane 24.

As a result, it is possible to suitably supply water to the three-phase interface surface as the reaction site where a reaction occurs during actual power generation of the stack 14, and place the electrolyte membrane 24 in the humid state to realize the desired proton conductivity. Therefore, it is possible to effectively activate the stack 14.

In the manner as described above, in the activation method, it is not required to provide an apparatus in large scale or large quantities of anode gas and cathode gas for applying large energizing current to the anode 26 and the cathode 28. For this reason, with the simple structure, it is possible to activate the stack 14 at low cost.

Further, as described above, after the voltage application step is performed to remove the materials adhered to the surface of the electrode catalyst, the energizing step is performed. In this manner, in the energizing step, it becomes possible to suitably supply water to the surface of the electrode catalyst without being obstructed by the adhered materials. Therefore, it is possible to effectively activate the stack 14.

Further, in the energizing step, preferably, the temperature regulating unit 44 and the gas supply unit 40 regulate the dew point of at least one of the anode gas and the cathode gas to become higher than the temperature of the stack 14. It is possible to easily condense the water vapor contained in at least one of the anode gas and the cathode gas inside the stack 14. Therefore, it becomes possible to suitably supply water to the surface of the electrolyte catalyst and the electrolyte membrane 24 to a greater extent, and effectively activate the stack 14.

Further, the temperature regulating unit 44 may regulate the temperature of the stack 14 in the energizing step to become not more than the temperature of the stack 14 in the voltage application step. Thus, it is possible to easily regulate the intra-stack relative humidity in the energizing step to become higher than the intra-stack relative humidity in the voltage application step. As a result, there is no need to regulate the dew point of the anode gas or the cathode gas by the gas supply unit 40 highly accurately. In the voltage application step, the water is not condensed easily inside the stack 14, and it is possible to suppress flooding inside the stack 14. Further, in the energization step, the water is condensed easily inside the stack 14, and it becomes possible to effectively supply water to the electrode catalyst, etc.

The first supply unit 40a may supply the anode gas and the cathode gas having the same dew point to the anode 26 and the cathode 28, respectively, in both of the voltage application step and the energizing step. The meaning of the expression "same" dew point herein may include "substantially the same" dew point. In this case, since there is no need to provide the step of regulating the dew points of the anode gas and the cathode gas between the voltage application step and the energizing step, it is possible to efficiently activate the stack 14.

Preferably, in the energizing step, the dew point of the cathode gas should be higher than the dew point of the anode gas. After activation of the stack 14 as described above is finished, the stack 14 is handled in the state where purging of the water inside the stack 14 is performed. As a purge gas for purging this water, the anode gas and the cathode gas having the reduced dew point can be used.

That is, the hydrogen gas as the purge gas is supplied to the anode 26, and the inert gas which is inexpensively handled in comparison with the hydrogen gas can be supplied as the purge gas to the cathode 28. Thus, after increasing the dew point of the cathode gas, and a large volume of the condensed water is distributed within the stack 14 on the cathode 28 side for activating the stack 14, a large volume of purge gas is supplied from the cathode 28. Thus, it becomes possible to achieve cost reduction.

The present invention is not limited particularly to the above described embodiment. Various modifications can be made without deviating from the gist of the present invention.

For example, in the above embodiment, the activation apparatus 10 includes the voltage application unit 42, and the voltage application step is performed. However, these features are not essential elements of the present invention. The activation apparatus 10 may not include the voltage application unit 42. That is, instead of the P/G stat 46, a galvanostat may be provided. Further, in the activation method, the energizing step may be performed without performing the voltage application step. In this case, it becomes possible to perform activation of the stack 14 at low cost with simpler structure.

EMBODIMENT EXAMPLES

Embodiment Example 1

A stack 14 was assembled by stacking ten power generation cells 12 each having an MEA 18 with an effective power generation area of 100 cm². This stack 14 was set to the activation apparatus 10, and the energizing step was performed. In the energizing step, the temperature of the stack 14 was regulated to 40° C. by the temperature regulating unit 44. Further, by the first supply unit 40a, a hydrogen gas as the anode gas having the dew point of 75° C. was supplied to the anode 26 at the flow rate of 5 NL/min., and by the second supply unit 40b, a nitrogen gas as the cathode gas having the dew point of 80° C. was supplied to the cathode 28 at the flow rate of 20 NL/min.

Thereafter, after it was confirmed that the average cell potential of the cathode 28 becomes substantially constant at 0.06 V, the anode 26 and the cathode 28 were energized by the energizing unit 41, and the magnitude of the electrical current applied between the anode 26 and the cathode 28 (electrodes) was increased and decreased within a range between 0 A and 3 A. That is, the energizing electrical current applied between the electrodes is cyclic current (periodic current). Specifically, the electrical current is increased from 0 A to 3 A for a period of 45 seconds. Thereafter, the electrical current is decreased from 3 A to 0 A for a period of 45 seconds. One cycle is made up of these periods. By changing the magnitude of the electrical current in this manner, the voltage (average voltage) between the electrodes is increased and decreased within a range between 0.60 V and 0.25 V.

By using different periods (energization periods) for applying the energizing current between the electrodes, a plurality of stacks 14 of the embodiment example 1 were produced. Specifically, the stacks 14 of embodiment examples 1-1 to 1-4 were obtained under conditions of the energization period shown in FIG. 2.

Comparative Example 1

A stack 14 immediately after assembling was used as a comparative example 1. That is, no energizing step is performed in the stack 14 of the comparative example 1, and thus, the energization period is 0.0.

For each of the stacks 14 of the embodiment examples 1-1 to 1-4, and the comparative example 1, after water was purged, the average cell voltage of the stack 14 was determined. At this time, the output current density was 1.0 A/cm². The ratio of each of the average cell voltage of each of the stacks 14 of the embodiment example 1 to the average cell voltage of the stack 14 of the comparative example 1 was calculated as the voltage ratio. That is, the voltage ratio of the stack 14 of the comparative example 1 was 1.000. The voltage ratio obtained in this manner is shown in FIG. 2 as well.

As shown in FIG. 2, all of the voltage ratios of the stacks 14 of the embodiment examples 1-1 to 1-4 where the energization process is performed are not less than 1.000, and larger than the average cell voltage of the stack 14 of the comparative example 1 where no energizing step is performed. As can be seen from the above, it can be said that, by performing the energizing step, it is possible to improve the output of the stack 14, i.e., it is possible to activate the stack 14. Further, it was found that, as the energization period gets longer, the voltage ratio becomes large, and it becomes possible to effectively activate the stack 14 to a greater extent.

Embodiment Example 2

Stacks 14 according to the embodiment example 2 was produced in the same manner as the embodiment example 1 except that, as the energization current applied between both electrodes, a fixed current at 3 A was used instead of the above cyclic current. That is, as shown in FIG. 3, by using different energization periods of the fixed current, the stacks 14 according to embodiment examples 2-1 to 2-4 were obtained. For each of the stacks 14, the voltage ratio was calculated in the same manner as in the case of the embodiment example 1, and the result is shown in FIG. 3 as well.

As shown in FIG. 3, also in the stacks 14 of the embodiment examples 2-1 to 2-4 where the fixed current is used as the energizing current applied between the electrodes, the voltage ratios which are substantially the same as that of the stack 14 of the embodiment example 1 where the cyclic current is used as the energizing current applied between the electrodes were obtained. That is, in any of the stacks 14 of the embodiment examples 2-1 to 2-4, the average cell voltage became larger than that of the stack 14 of the comparative example 1 where the energizing step is not performed. Therefore, it was found that, by performing the energizing step of applying the fixed current as the energizing current, as in the case of performing the energizing step of applying the cyclic current as the energizing current, it is possible to effectively activate the stack 14. Further, it was found that, as the energization period gets longer, it is possible to more effectively activate the stack 14.

Embodiment Example 3

Stacks 14 according to the embodiment examples 3-1 to 3-10 were produced in the same manner as in the case of the embodiment example 2 except that the magnitude of the fixed current as the energizing current applied between the electrodes (energizing current value) is changed as shown in FIG. 4. These embodiment examples 3-1 to 3-10 will also be referred to as the embodiment example 3, collectively. It should be noted that the stacks 14 of the embodiment examples 3-6 were produced under substantially the same conditions as the stack 14 of the embodiment example 2-1.

Comparative Example 2

For comparison, without applying energizing current between the electrodes of the stack 14 after assembling, the anode gas and the cathode gas were supplied under the same conditions as in the cases of the embodiment examples 1 to 3, and this state is maintained for 0.50 hours to produce the stack 14 according to the comparative example 2.

For each of the stacks 14 of the embodiment example 3 and the comparative example 2, the voltage ratio was calculated in the same manner as in the case of the embodiment example 1. Both of the obtained voltage ratio and the voltage applied between the electrodes at the time of energization in correspondence with the energizing current value are shown in FIG. 4.

As shown in FIG. 4, in each of the stacks 14 of the embodiment examples 3-1 to 3-10, the voltage ratio became larger than that of the stack 14 of the comparative example 2 where only the anode gas and the cathode gas are supplied without performing the energizing step. As can be seen from the above, by applying the energizing current between the electrodes, it is possible to effectively activate the stack 14. Further, it was found that, as the energizing current value gets larger, the voltage ratio gets larger as well, and it becomes possible to more effectively activate the stack 14. Further, it was found that, after the voltage ratio reaches 1.050, even if the energization current value is increased much more, the rise ratio of the voltage ratio becomes small.

Embodiment Example 4

Stacks 14 of the embodiment examples 4-1 to 4-7 were produced in the same manner as in the case of the embodiment example 2 except that the temperature of the stack 14, the dew point of the anode gas, and the dew point of the cathode gas were changed according to the conditions shown in FIG. 5. These embodiment examples 4-1 to 4-7 will also be referred to as the embodiment example 4, collectively. It should be noted that the stack 14 of the embodiment example 4-4 was produced under substantially the same conditions as the stack 14 of the embodiment example 2-1.

For each of the stacks 14, the intra-stack relative humidity was calculated based on the above (equation 1) from the saturated water vapor amount at the higher one of the dew point of the anode gas and the dew point of the cathode gas, and the saturated water vapor amount at the temperature of the stack 14. Further, the voltage ratio was calculated in the same manner as in the case of the embodiment example 1, and the result is shown in FIG. 5 as well.

As shown in FIG. 5, in the stack 14 of the embodiment example 4-7, both of the dew points of the anode gas and the cathode gas are lower than the temperature of the stack 14. Also in this case, it was possible to activate the stack 14 using the voltage ratio of not less than 1. In contrast, in the stacks 14 of the embodiment examples 4-1 to 4-6, the dew point of at least one of the anode gas and the cathode gas was regulated to become not less than the temperature of the stack 14. In this case, it was possible to increase the voltage ratio in comparison with the stack 14 of the embodiment example 4-7. Therefore, it can be said that, by regulating at least one of the dew point of at least one of the anode gas and the cathode gas to become higher than the temperature of the stack 14, it is possible to effectively activate the stack 14 to a greater extent.

Further, the embodiment example 4-2 and the embodiment example 4-4 of FIG. 5 were obtained under the same conditions except the temperature of the stack 14. As a result of comparison of these embodiment examples, in the stack 14 of the embodiment example 4-6 where the temperature of the stack 14 is 40° C., a large voltage ratio was obtained in comparison with the stack 14 of the embodiment example 4-2 where the temperature of the stack 14 is 80° C.

As can be seen from the above, it can be said that, by decreasing the temperature of the stack 14 and increasing the intra-stack relative humidity to increase the quantity of condensed water produced in the stack 14, it is possible to effectively activate the stack 14 to a greater extent.

The embodiment example 4-4 and the embodiment example 4-5 in FIG. 5 were implemented under the same conditions except the dew point of the anode gas. As a result of comparison of these items of data, it was found that the difference between the voltage ratio of the stack 14 of the embodiment example 4-4 and the voltage ratio of the stack 14 of the embodiment example 4-5 was about 0.4%. As can be seen from the above, even in the embodiment example 4-5 where the dew point of the anode gas is significantly lower than that of the embodiment example 4-4, by sufficiently increasing the dew point of the cathode gas to maintain the intra-stack relative humidity, it is possible to activate the stack 14 sufficiently suitably.

Further, also in the stack 14 where the dew point of the cathode gas instead of the dew point of the anode gas is significantly low, by increasing the dew point of the anode gas to maintain the intra-stack relative humidity, the same result as in the case where the dew point of the cathode gas is low as described above was obtained.

Therefore, it can be said that, by supplying a gas having a sufficiently high dew point to one of the electrodes, i.e., the anode 26 or the cathode 28, it is possible to humidify the other electrode. Thus, it was found that, by regulating the dew point of at least one of the anode gas and the cathode gas in the energizing step to become higher than the temperature of the stack 14, etc., it is possible to suitably activate the stack 14.

Further, the embodiment example 4-4 and the embodiment example 4-6 of FIG. 5 were implemented under the same conditions except the dew point of the anode gas and the dew point of the cathode gas. Based on the result of comparison of these items of data, it was found that the same voltage ratio was obtained in both of the case where the dew point of the anode gas is higher than the dew point of the cathode gas, and the case where the dew point of the cathode gas is higher than the dew point of the anode gas.

Embodiment Example 5

Stacks 14 of the embodiment examples 5 were produced in the same manner as in the case of the embodiment example 2 except that the flow rate of the anode gas and the flow rate of the cathode gas were changed. Specifically, the stacks 14 of the embodiment examples 5-1 to 5-3 were obtained under the conditions shown in FIG. 6. These embodiment examples 5-1 to 5-3 will also be referred to as the embodiment example 5, collectively. It should be noted that the stack 14 of the embodiment example 5-1 was produced under substantially the same conditions as the stack 14 of the embodiment example 2-1. For each of the stacks 14, the voltage ratio was calculated in the same manner as in the case of the embodiment example 1, and the result is shown in FIG. 6 as well.

As can be seen from FIG. 6, at the flow rates of all of the gases in the embodiment examples 5-1 to 5-3, it was possible to achieve the sufficiently large voltage ratio of not less than 1.000. As can be seen from the above, it was found that, even if the flow rate of the gas is changed as in the cases of the embodiment examples 5-1 to 5-3, it is possible to effectively activate the stack 14.

Embodiment Example 6

In the same manner as in the case of the embodiment example 1, the stack 14 immediately after assembling was set at the activation apparatus 10, and the voltage application step was performed. In the voltage application step, the temperature of the stack 14 was regulated to 80° C. by the temperature regulating unit 44. Further, by the first supply unit 40a, a hydrogen gas as the anode gas having the dew point of 75° C. was supplied to the anode 26 at the flow rate of 5 NL/min., and by the second supply unit 40b, a nitrogen gas as the cathode gas having the dew point of 80° C. was supplied to the cathode 28 at the flow rate of 20 NL/min.

Thereafter, after it was confirmed that the average cell potential of the cathode 28 becomes substantially constant at 0.1 V, cyclic voltage which is increased or decreased within a range between 0.08 V and 1.00 V was applied to the stack 14. At this time, the voltage is increased from 0.08 V to 1.00 V for a period of 45 seconds. Thereafter, the voltage is decreased from 1.00 V to 0.08 V for a period of 45 seconds. One cycle is made up of these periods. This cycle was repeated 20 times. One cycle is 90 seconds. Therefore, the voltage application step was performed for 0.50 hours.

After the voltage application step was performed as described above, the energizing step of energizing the stack 14 using the cyclic current was performed in the same manner as the embodiment example 1. Specifically, stacks 14 of embodiment examples 6-1 to 6-8 were obtained under conditions of the energization period shown in FIG. 7. These embodiment examples 6-1 to 6-8 will also be referred to as the embodiment example 6, collectively. For each of the stacks 14, the voltage ratio was calculated in the same manner as in the case of the embodiment example 1, and the result is shown in FIG. 7 as well.

As can be seen from FIG. 7, in all the stacks 14 of the embodiment examples 6-1 to 6-8 where the energizing step was performed (using the cyclic current) after the voltage application step, the voltage ratio of not less than 1.000 was achieved. Further, it was found that, as the energization period gets longer, it becomes possible to increase the voltage ratio. Further, it was found that, in the stacks 14 of the embodiment examples 6-1 to 6-8, it is possible to increase the voltage ratio more suitably than the stacks 14 of the embodiment examples 1-1 to 1-4 where only the energizing step was performed.

Therefore, after removing the materials adhered to the surface of the electrode catalyst contained in the anode 26 and the cathode 28 are removed in the voltage application step, the energizing step is performed. In this manner, it is possible to suitably supply water to the surface of the electrode catalyst without being obstructed to the adhered materials. Accordingly, it is possible to effectively activate the stack 14 to a greater extent.

Embodiment Example 7

Stacks 14 of an embodiment example 7 were produced in the same manner as in the case of the embodiment example 6 except that the voltage application period for applying the voltage to the stack 14 in the voltage application step and the energization period for applying the energizing current between the electrodes in the energizing step were changed. Specifically, the stacks 14 of the embodiment examples 7-1 to 7-3 were obtained under conditions of the voltage application period and the energization period shown in FIG. 8. It should be noted that the stack 14 of the embodiment example 7-2 was produced under substantially the same conditions as the stack 14 of the embodiment example 6-2. Further, the embodiment example 7 was set up in a manner that the total time period of the voltage application period and the energization period was 1.00 hour, and the time allocation between the voltage application period and the energization period was changed.

For each of the stacks 14 of the embodiment example 7, the voltage ratio was calculated in the same manner as in the case of the embodiment example 1, and the result is shown in FIG. 8 as well. As can be seen from FIG. 8, in all of time allocations of the embodiment examples 7-1 to 7-3, the voltage ratio of not less than 1.000 was achieved, and moreover, it is possible to increase the voltage ratio more suitably than the stacks 14 of the embodiment examples 1-1 to 1-4 where only the energizing step was performed (using the cyclic current). As can be seen from the above, even if the time allocation is changed as in the case of the embodiment examples 7-1 to 7-3, it is possible to effectively activate the stack 14.

Further, in the embodiment example 7, it was found that, the largest voltage ratio was achieved in the stack 14 of the embodiment example 7-2 where both of the voltage application period and the energization period are 0.50 hours, and in the embodiment example 7-2, it is possible to effectively activate the stack 14.

Embodiment Example 8

Stacks 14 of the embodiment example 8 were produced in the same manner as in the case of the embodiment example 6 except that, instead of the cyclic current, a fixed current having a constant value of 3 A was used as the energizing current in the energizing step. That is, after the voltage application step was performed in the same manner as in the case of the embodiment example 6, as shown in FIG. 9, by adopting different energizing periods for applying the fixed current, the stacks 14 of the embodiment examples 8-1 to 8-8 were obtained. For each of these stacks 14, the voltage ratio was calculated in the same manner as in the case of the embodiment example 1, and the result is shown in FIG. 9 as well.

As shown in FIG. 9, in the stacks 14 of the embodiment examples 8-1 to 8-8 where the fixed current is used as the energizing current in the energizing step after the voltage application step, substantially the same voltage ratio as in the case of the stack 14 of the embodiment example 1 where the cyclic current is used as the energizing current was obtained. Therefore, it was found that, also in the case of performing the energizing step using the fixed current as the energizing current after the voltage application step, as in the case of performing the energizing step using the cyclic current as the energizing current after the voltage application step, it is possible to effectively activate the stack 14 to a greater extent. Further, it was found that, as the energizing period gets longer, it becomes possible to more effectively activate the stack 14.

Embodiment Example 9

Stacks 14 of an embodiment example 9 were produced in the same manner as in the case of the embodiment example 8 except that the voltage application period for applying the voltage to the stack 14 in the voltage application step and the energizing period for applying the energizing current between the electrodes in the energizing step were changed. Specifically, the stacks 14 of embodiment examples 9-1 to 9-3 were obtained under conditions of the voltage application period and the energization period shown in FIG. 10. It should be noted that the stack 14 of the embodiment example 9-2 was produced under substantially the same conditions as the stack 14 of the embodiment example 8-2. Further, the embodiment example 9 was set up in a manner that the total time period of the voltage application period and the energization period was 1.00 hour, and the time allocation between the voltage application period and the energization period was changed.

For each of the stacks 14 of the embodiment example 9, the voltage ratio was calculated in the same manner as in the case of the embodiment example 1, and the result is shown in FIG. 10 as well. As can be seen from FIG. 10, it was found that, in all of time allocations of the embodiment examples 9-1 to 9-3, the voltage ratio of not less than 1.000 was achieved, and moreover, it is possible to increase the voltage ratio more suitably than the stacks 14 of the embodiment examples 2-1 to 2-4 where only the energizing step was performed (using the fixed current). As can be seen from the above, even in the case where the time allocation is changed as in the case of the embodiment examples 9-1 to 9-3, it is possible to effectively activate the stack 14.

Further, in the embodiment example 9, the largest voltage ratio was obtained in the stack 14 of the embodiment example 9-2 where both of the voltage application period and the energization period are 0.50 hours, and it is possible to effectively activate the stack 14.

Embodiment Example 10

Stacks 14 of embodiment examples 10-1 to 10-10 were produced in the same manner as in the case of the embodiment example 8 except that the energizing current value is changed as shown in FIG. 11. These embodiment examples 10-1 to 10-10 will also be referred to as the embodiment example 10, collectively. It should be noted that the stack 14 of the embodiment example 10-6 was produced under substantially the same conditions as the stack 14 of the embodiment example 8-2.

For each of the stacks 14 of the embodiment example 10, the voltage ratio was calculated in the same manner as in the case of the embodiment example 1. The voltage ratio obtained in the embodiment example 10 and the voltage applied between the electrodes at the time of energization in correspondence with the energizing current value are shown in FIG. 11 as well. As can be seen FIG. 11, it was found that, as the energizing current value gets larger, the voltage ratio tends to become large, and it is possible to more effectively activate the stack 14.

Embodiment Example 11

In the voltage application step of the embodiment example 8, the flow rate of the anode gas was set to 10 NL/min., and the flow rate of the cathode gas was set to 40 NL/min. Further the temperature of the stack 14 and the dew point of the anode gas were changed under the conditions shown in FIG. 12. Further, in the energizing step of the embodiment example 8, the temperature of the stack 14, the dew point of the anode gas, and the dew point of the cathode gas were changed in accordance with the conditions shown in FIG. 12. In other respects, stacks 14 of the embodiment examples 11-1 to 11-9 were produced in the same manner as in the case of the embodiment example 8. These embodiment examples 11-1 to 11-9 will also be referred to as the embodiment example 11, collectively. It should be noted that the stack 14 of the embodiment example 11-6 was produced substantially under the same conditions as the stack 14 of the embodiment example 8-2.

For each of the stacks 14 of the embodiment example 11, the intra-stack relative humidity in the voltage application step and the energizing step were calculated in the same manner as in the case of the embodiment example 4. Further, the voltage ratio was calculated in the same manner as in the case of the embodiment example 1. These results are shown in FIG. 12 as well. In the embodiment examples 11-4 and 11-5, in comparison with the other embodiment examples, the intra-stack relative humidity in the voltage application step is high. Therefore, in order to avoid the occurrence of the above flooding, the flow rate of the anode gas and the flow rate of the cathode gas in the voltage application step were increased.

As shown in FIG. 12, in the stack 14 of the embodiment example 11-9, both of the dew point of the anode gas and the dew point of the cathode gas were lower than the temperature of the stack 14. Also in this case, the voltage ratio became not less than 1.000, and it was possible to effectively activate the stack 14. In contrast, in all of the stacks 14 of the embodiment examples 11-1 to 11-8, the dew point of at least one of the anode gas and the cathode gas was regulated to become higher than the temperature of the stack 14. In this case, it was found that the large voltage ratio was achieved in comparison with the stack 14 of the embodiment example 11-9, and it is possible to effectively activate the stack 14 to a greater extent.

In each of the embodiment examples 11-1 to 11-9 in FIG. 12, the temperature of the stack 14 in the energizing step is not more than the temperature of the stack 14 in the voltage application step. It was found that, in this manner, it is possible to regulate the voltage ratio to became not less than 1.000, and effectively activate the stack 14.

The stack 14 of the embodiment example 11-2 and the stack 14 of the embodiment example 11-6 were implemented under the same conditions except the temperature of the stack 14 in the energizing step. That is, the temperature of the stack 14 in the voltage application step was 80° C. in both of the embodiment example 11-2 and the embodiment example 11-6. As a result of comparison of these embodiment examples, in the stack 14 of the embodiment example 11-6 where the temperature of the stack 14 in the energizing step is 40° C., the voltage ratio became about 2% larger than that of the stack 14 of the embodiment example 11-2 where the temperature of the stack 14 in the energizing step is 70° C.

As can be seen from the above, by regulating the temperature of the stack 14 in the energizing step to become significantly lower than the temperature of the stack 14 in the voltage application step to increase the quantity of condensed water produced in the stack 14 in the energizing step, it is possible to effectively activate the stack 14 to a greater extent.

The stack 14 of the embodiment example 11-1 and the stack 14 of the embodiment example 11-4 in FIG. 12 were implemented under the same conditions except the temperature of the stack 14 and the flow rate of the anode gas and the flow rate of the cathode gas in the voltage application step. Further, the stack 14 of the embodiment example 11-2 and the stack 14 of the embodiment example 11-5 were implemented under the same conditions except the temperature of the stack 14 and the flow rate of the anode gas and the flow rate of the cathode gas in the voltage application step. As a result of comparison of these embodiment examples, in comparison with the stacks 14 of the embodiment examples 11-1, 11-2, in the stack 14 of the embodiment examples 11-4, 11-5 where the temperature of the stack 14 is low, and the flow rate of the anode gas and the flow rate of the cathode gas are large, the voltage ratio is large by about 1 to 2%.

As can be seen from the above, in the voltage application step, by satisfying at least one of the condition that the temperature of the stack 14 is low (intra-stack relative humidity is high) and the condition that the flow rate of the anode gas and the flow rate the cathode gas are large, it is possible to effectively activate the stack 14.

The stacks 14 of the embodiment example 11-6 and the embodiment example 11-7 of FIG. 12 were implemented under the same conditions except the dew point of the anode gas in each of the voltage application step and the energizing step. As a result of comparison of these items of data, it was found that the stack 14 of the embodiment example 11-6 and the stack 14 of the embodiment example 11-7 have the same voltage ratio. As can be seen from the above, in the voltage application step and the energizing step, even in the embodiment example 11-7 where the dew point of the anode gas is significantly low in comparison with the embodiment example 11-6, by sufficiently increasing the dew point of the cathode gas to maintain the intra-stack relative humidity, it is possible to suitably activate the stack 14.

Further, also in the stack 14 where the dew point of the cathode gas, instead of the anode gas is significantly low, by increasing the dew point of the anode gas to maintain the intra-stack relative humidity, the same results as in the case where the dew point of the cathode gas is low were obtained. Therefore, it was found that, also in the energizing step after performing the voltage application step, by regulating the dew point of at least one of the anode gas and the cathode gas to become significantly higher than the temperature, etc. of the stack 14, it is possible to activate the stack 14 suitably.

Stacks 14 of the embodiment example 11-6 and the embodiment example 11-8 in FIG. 12 were implemented under the same conditions except the dew point of the anode gas and the cathode gas in the energizing step. Based on the result of comparison of these items of data, it was found that, also in the energizing step after performing the voltage application step, the same voltage ratio was obtained in both of the case where the dew point of the anode gas is higher than the dew point of the cathode gas, and the case where the dew point of the cathode gas is higher than the dew point of the anode gas.

Embodiment Example 12

Stacks 14 of the embodiment example 12 were produced in the same manner as in the case of the embodiment example 8 except that the flow rate of the anode gas and the flow rate of the cathode gas were changed. Specifically, the stacks 14 of the embodiment examples 12-1 to 12-3 were obtained under the conditions shown in FIG. 13. These embodiment examples 12-1 to 12-3 will also be referred to as the embodiment example 12, collectively. It should be noted that the stack 14 of the embodiment example 12-1 was produced under substantially the same conditions as the stack 14 of the embodiment example 8-2. For each of the stacks 14, the voltage ratio was calculated in the same manner as in the case of the embodiment example 1, and the result is shown in FIG. 13 as well.

As can be seen from FIG. 13, at the flow rates of all of the gases in the embodiment examples 12-1 to 12-3, it was possible to achieve the sufficiently large voltage ratio of not less than 1.000. As can be seen from the above, even if the flow rate of the gas is changed as in the cases of the embodiment examples 12-1 to 12-3, it is possible to effectively activate the stack 14.

What is claimed is:

1. A method of activating a fuel cell, the fuel cell comprising an electrolyte membrane of solid polymer, an anode provided on one surface of the electrolyte membrane, and a cathode provided on another surface of the electrolyte membrane, the method comprising a voltage application step of applying cyclic voltage which is increased and decreased within a predetermined range, to the fuel cell while supplying a hydrogen gas as an anode gas to the anode and supplying an inert gas as a cathode gas to the cathode, wherein the predetermined range is between an upper bound and a lower bound, and neither the upper bound nor the lower bound is zero volts, and an energizing step of electrically connecting the anode and the cathode to apply current therebetween in a state where a potential difference is produced between the anode and the cathode, by supplying the hydrogen gas as the anode gas to the anode and supplying the inert gas as a cathode gas to the cathode, wherein a temperature of the fuel cell in the energizing step is regulated to be not more than a temperature of the fuel cell in the voltage application step.

2. The method of activating the fuel cell according to claim 1, wherein in the energizing step, magnitude of the current applied from the cathode to the anode is increased and decreased repeatedly within a predetermined range.

3. The method of activating the fuel cell according to claim 1, wherein, in the energizing step, magnitude of the current applied from the cathode to the anode is fixed at a constant level.

4. The method of activating the fuel cell according to claim 1, wherein in the energizing step, a dew point of at least one of the anode gas and the cathode gas is regulated to become higher than a temperature of the fuel cell.

5. The method of activating the fuel cell according to claim 1, wherein a heat transmission medium having a regulated temperature is supplied to a coolant flow field provided for the fuel cell to regulate the temperature of the fuel cell.

6. A method of activating a fuel cell, the fuel cell comprising an electrolyte membrane of solid polymer, an anode provided on one surface of the electrolyte membrane, and a cathode provided on another surface of the electrolyte membrane, the method comprising an energizing step of electrically connecting the anode and the cathode simply through an energizing unit in a state where a hydrogen concentration difference is produced between the anode and the cathode, by supplying a hydrogen gas as an anode gas to the anode and supplying an inert gas as a cathode gas to the cathode to form a hydrogen concentration cell, wherein in the energizing step, electrons generated in the anode is supplied to the cathode by an electromotive force of the hydrogen concentration cell.

* * * * *